United States Patent
Nakahori et al.

(10) Patent No.: US 7,341,391 B2
(45) Date of Patent: Mar. 11, 2008

(54) PIPE FITTING AND ASSEMBLY USING SUCH PIPE FITTINGS

(75) Inventors: Hiroyuki Nakahori, Osaka (JP); Tomoaki Hirooka, Osaka (JP)

(73) Assignees: Sekisui Jushi Kabushiki Kaisha, Osaka-shi (JP); Takiron Co., Ltd., Osaka-shi (JP)

( * ) Notice: Subject to any disclaimer, the term of this patent is extended or adjusted under 35 U.S.C. 154(b) by 0 days.

(21) Appl. No.: 10/332,808

(22) PCT Filed: May 13, 2002

(86) PCT No.: PCT/JP02/04625

§ 371 (c)(1),
(2), (4) Date: Jan. 13, 2003

(87) PCT Pub. No.: WO02/093022

PCT Pub. Date: Nov. 21, 2002

(65) Prior Publication Data

US 2004/0101354 A1     May 27, 2004

(30) Foreign Application Priority Data

May 15, 2001   (JP)   ............................. 2001-144048

(51) Int. Cl.
*F16B 7/04*   (2006.01)
*E04H 12/00*   (2006.01)

(52) U.S. Cl. ........................ 403/27; 403/170; 403/338; 52/653.2

(58) Field of Classification Search .................. 403/27, 403/49, 170, 192, 196, 256–262, 338, 373, 403/385, 386, 395, 396, 398–400, 403, 169, 403/186, 187, 205; 52/653.2, 655.1; 135/909; 248/230.5, 229.24, 229.64, 231.61, 229.14; 33/486, 832–833, 529, 700

See application file for complete search history.

(56) References Cited

U.S. PATENT DOCUMENTS

| | | | | |
|---|---|---|---|---|
| 885,240 A * | 4/1908 | Graham | ...................... | 403/175 |
| 889,223 A * | 6/1908 | Graham | ...................... | 52/653.2 |
| 1,150,781 A * | 8/1915 | Louden | ...................... | 403/218 |
| 1,261,213 A * | 4/1918 | Clay | ........................... | 403/173 |
| 1,803,508 A * | 5/1931 | Rossman | .................... | 403/173 |
| 2,885,233 A * | 5/1959 | Horowitz | ................... | 403/170 |
| 5,564,816 A * | 10/1996 | Arcadia et al. | ............. | 362/183 |

FOREIGN PATENT DOCUMENTS

| | | | |
|---|---|---|---|
| GB | 2316121 A | * | 2/1998 |
| JP | 49-065014 A1 | | 6/1974 |
| JP | 53-025170 A1 | | 12/1975 |
| JP | 60-112504 A1 | | 7/1985 |
| JP | 01-092507 A1 | | 6/1989 |
| JP | 02-119510 A1 | | 9/1990 |

* cited by examiner

*Primary Examiner*—Daniel P. Stodola
*Assistant Examiner*—Victor MacArthur
(74) *Attorney, Agent, or Firm*—Cheng Law Group, PLLC

(57) ABSTRACT

A pipe fitting of the present invention comprises a combination of a plurality of split fittings and has a central cylinder and an extended cylinder which outwardly projects from the central cylinder, the central cylinder and the extended cylinder being capable of receiving pipes from orthogonal directions with respect to each other. The extended cylinder includes a bolt hole which locates near the central cylinder and which penetrates the extended cylinder. The central cylinder has an aperture provided in a side surface thereof. Each split fitting is fixed on the pipes by a bolt and nut via the respective bolt hole.

11 Claims, 11 Drawing Sheets

(a)

(b)

PIPE FITTING AND ASSEMBLY USING SUCH PIPE FITTINGS

TECHNICAL FIELD

The present invention relates to a pipe fitting for connecting pipes of various lengths, and an assembly using such pipe fittings.

BACKGROUND ART

In a conventional arrangement for assembling pipes of various lengths with use of fittings, several types of split fittings are combined at the ends of pipes or in the middle of a pipe. Each of these split fittings has pipe support sections whose dimensions and shape conform to the components (i.e. pipes), and forms tubular sections when combined with each other. Into these tubular sections, pipes are inserted and fixed by bolts and nuts in a clamped manner. As is already known, this structure is utilized to assemble a plurality of pipes in an orthogonal arrangement, freely in the lengthwise and widthwise directions.

As an example of the prior art, Japanese Examined Patent Publication No. S53-25170 discloses a pipe connection method and a fitting therefor. This method utilizes a split fitting which has an arc-shaped (or half arc-shaped, ¼ arc-shaped) grip and half pipe-shaped pipe sections consecutively extending therefrom. While a pipe P1 is inserted into the grip, a pipe P2 is fitted into the opposing pipe sections from a different direction. To fix these pipes, the fitting is tightly clamped in the pipe sections, at a position closer to the grip.

To give another example, Japanese Utility Model Laid-open Publication No. H1-92507 discloses a pipe connector which comprises two connector members and a bolt and nut for fixing them. Each of the connector members has half-cylindrical pipe support recesses which are oriented perpendicularly to each other, such that the recesses form a part of near-cylindrical pipe support sections when the connector members are mated together. One of the half-cylindrical pipe recesses includes a slot which extends along the length of the recess. In this slot, the bolt can be fixed displaceably along the slot.

In order to combine and fix the split fitting (or the connector) by a bolt and nut, Japanese Examined Patent Publication No. S53-25170 teaches to pass a bolt and nut 6 through a hole 5 formed in each half pipe-shaped pipe section, thereby fixing the split fitting at a desired position on the pipe P1. Similarly, regarding Japanese Utility Model Laid-open Publication No. H1-92507, the hole for a tightening bolt is designed in the form of a slot, for convenience of installation. By means of the tightening bolt, the pipe surface is fixedly clamped in the half-cylindrical pipe support recesses. Thus, in both examples, the components are fixed by a friction force which is generated between the pipe support sections and the pipes by tightening a bolt and nut.

However, some problems tend to arise when the fitting is mounted on the pipe P1 according to Japanese Examined Patent Publication No. S53-25170, and when the fitting (half-cylindrical pipe support recesses) is attached to the pipe according to Japanese Utility Model Laid-open Publication No. H1-92507. In both cases, a worker locates and fixes the fitting at an approximate installation position, depending on his/her sense. By way of example, when the fitting is equipped to the pipe P1 of the former reference or to the pipe of the latter reference in order to assemble a shelf, if the installation operation lacks precision in height dimension, the assembled shelf will wobble or show other defects. Thus, as far as the installation operation relies on worker's sense, it is difficult to conduct exact height adjustment.

The present invention is made to solve such problems. An object of the present invention is to provide a pipe fitting which connects the pipe fitting to a pipe with a good dimensional precision, thus ensuring an exact assembly operation, and which can fix the pipe and the pipe fitting together, in a simple manner and with a reinforcing effect. Another object of the present invention is to provide an assembly using such pipe fittings.

DISCLOSURE OF THE INVENTION

To solve the above problems, a pipe fitting of the present invention comprises a combination of a plurality of split fittings and has a central cylinder and an extended cylinder which outwardly projects from the central cylinder, the central cylinder and the extended cylinder being capable of receiving pipes from orthogonal directions with respect to each other. This pipe fitting is characterized in that the extended cylinder includes a bolt hole which locates near the central cylinder and which penetrates the extended cylinder, that the central cylinder has an aperture provided in a side surface thereof, and that each split fitting is fixed on the pipes by a bolt and nut via the respective bolt hole.

According to this structure, each pipe is fixed with the fitting by a bolt and nut. Besides, the pipe may be marked beforehand so as to indicate its position to be fixed. The position relative to the pipe can be checked by means of the positioning mark which is recognizable through the aperture provided in the side surface of the central cylinder.

With regard to the above structure, the aperture provided in the side surface of the central cylinder may be a slit which extends orthogonally relative to an insertion direction of the pipe to be inserted and clamped in the central cylinder. Alternatively, the aperture provided in the side surface of the central cylinder may be a slit which extends orthogonally relative to an insertion direction of the pipe to be inserted in the extended cylinder. As another option, the aperture may combine both structures to be a cross-shaped slit.

The aperture of these structures can expose the positioning mark for equipping the central cylinder of the pipe fitting onto the pipe.

Moreover, the extended cylinder may have an auxiliary fixation hole which locates further away from the central cylinder than the bolt hole.

Through the auxiliary fixation hole of this structure, it is possible to observe the state of the inserted pipe inside the extended cylinder. Besides, the fixed relationship between the pipes and the pipe fitting can be reinforced by a fixing member (e.g. a screw) placed through the auxiliary fixation hole.

Further, in the extended cylinder which is formed by mating two split fittings together, a notch may be provided in a mating edge of each split fitting, as opposed to each other.

According to this structure, the opposing notches form a hole in the mating edges of the extended cylinder, namely, across the two split fittings. A fixing screw for fixing a shelf board can be aligned with the hole and screwed on the pipe through the shelf board.

In addition, the pipe fitting which has at least one of the above characteristic structures (claims 1 to 5) may be any of pipe fittings (a)-(e) which further incorporate specific features as mentioned below.

(a) A pipe fitting which comprises two split fittings. A first split fitting is a ¼-cylindrical split fitting which is composed of a ¼ cylinder wall of the central cylinder having a 90° arc, and extended half pipes which have a half pipe shape and which project from both ends of the cylinder wall at 90° relative to the cylinder wall. A second split fitting is a ¾-cylindrical split fitting which is composed of a ¾ cylinder wall of the central cylinder having a 270° arc, and extended half pipes which have a half pipe shape and which project from both ends of the cylinder wall at 90° relative to the cylinder wall.

(b) A pipe fitting which comprises a combination of two ½-cylindrical single-extension split fittings. Each split fitting is composed of a ½ cylinder wall of the central cylinder having a 180° arc, and an extended half pipe which has a half pipe shape and which projects from an end of the cylinder wall at 90° relative to the cylinder wall.

(c) A pipe fitting which comprises a combination of two ½-cylindrical double-extension split fittings. Each split fitting is composed of a ½ cylinder wall of the central cylinder having a 180° arc, and extended half pipes which have a half pipe shape and which project from both ends of the cylinder wall at 90° relative to the cylinder wall.

(d) A pipe fitting which comprises a combination of two such ¼-cylindrical split fittings and one such ½-cylindrical double-extension split fitting.

(e) A pipe fitting which comprises a combination of four such ¼-cylindrical split fittings.

The pipe fittings of these additional structures show similar effects, when adopted to the structures corresponding to claims 1 to 5.

Furthermore, an assembly using the pipe fitting of the present invention is characterized in that pipes are fixed by a plurality of pipe fittings of the above structure.

BEST MODE FOR CARRYING OUT THE INVENTION

Embodiments of the present invention are hereinafter described with reference to the drawings.

Figure 1:
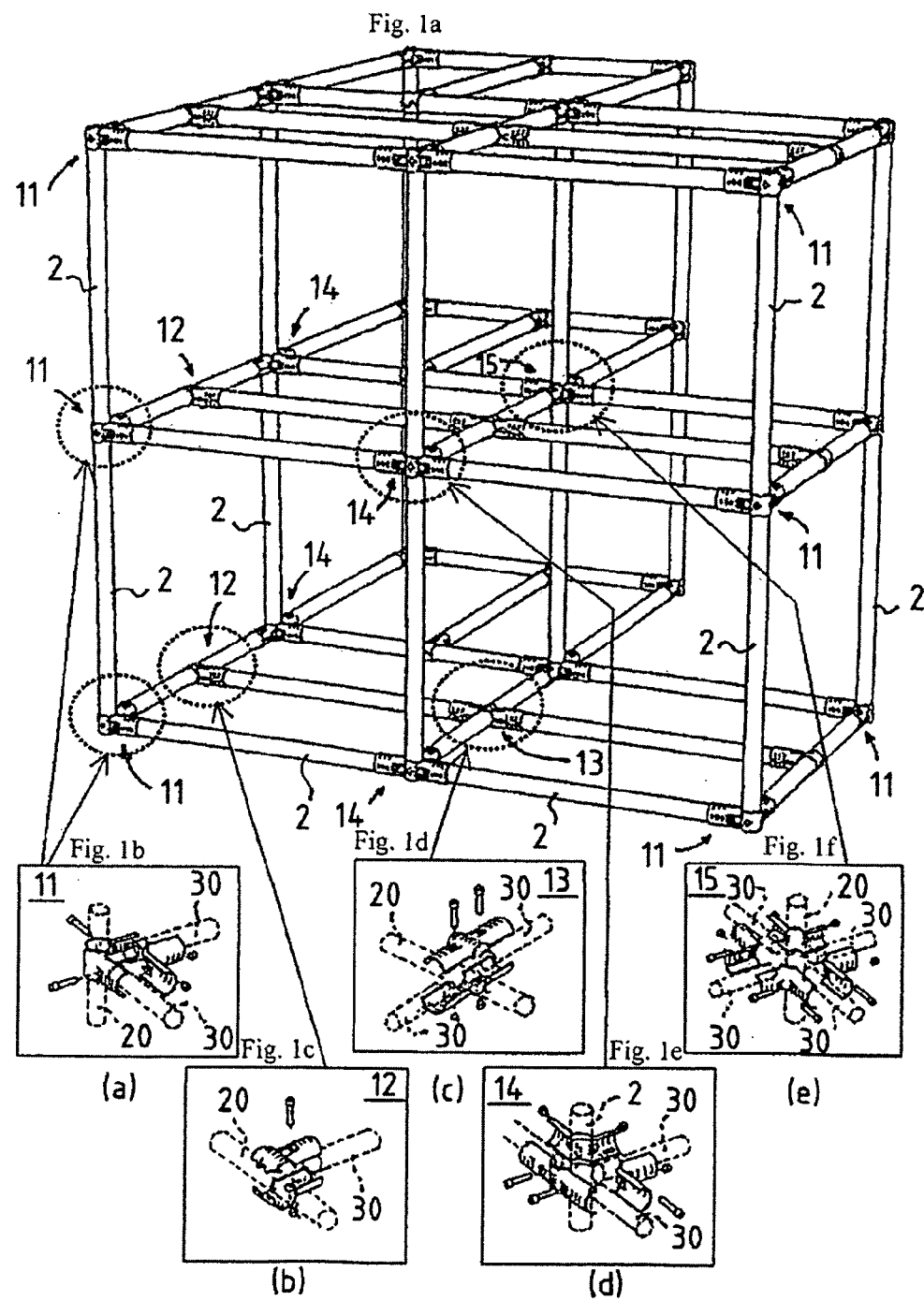
FIGS. 1a-1f show an embodiment of pipe fittings and an assembly using such pipe fittings according to the present invention.

FIG. 1 is a perspective view showing an embodiment of a pipe fitting and an assembly using such pipe fittings according to the present invention. The assembly is an item shelf in this example.

In this structure, several types of split fittings are combined at the ends of pipes and in the middle of a pipe. Each of these split fittings has pipe support sections whose dimensions and shape conform to the components (i.e. pipes), and forms tubular sections when combined with each other. Pipes are inserted into these tubular sections and fixed in a clamped manner. As a result, pipes of various lengths are assembled freely in the lengthwise, widthwise and heightwise directions to constitute a desired item shelf.

Pipes to be suitably used in this embodiment include, for example, plastic pipes, metal pipes made of steel such as stainless steel and iron, paper pipes, synthetic resin-coated metal pipes in each of which the surface of a core metal pipe is covered with a synthetic resin layer.

As for the split fittings which constitute the pipe fitting, applicable split fittings include press-molded fittings made of steel plates such as stainless steel plate and iron plate, metal fittings cast from alloy materials such as aluminum alloy and zinc alloy, plastic fittings made by injection molding of synthetic resin materials. The split fittings used in the following embodiments are made of a 2.6-mm-thick cold-rolled steel plate, which is press-molded and subjected to coating finish. Incidentally, each pipe is understood to have a circular cross section and an outer diameter of 28 mm.

The split fitting to be applied in the present embodiments includes pipe support sections each of which has a part-cylindrical inner surface that conforms to the cylindrical shape of the pipe. When the split fittings are combined together, their pipe support sections define cylindrical inner surfaces. Thus, the combined split fittings constitute a central cylinder 3 for fixing a pipe 20 which passes through the fitting along the corresponding cylindrical inner surface, and an extended cylinder or cylinders 4 for receiving the end or ends of a pipe or pipes 30. In this arrangement, the pipe 30 is to be connected vertically relative to the central cylinder 3 in at least one direction, or the pipes 30 are to be connected radially relative to the central cylinder 3 in two, three or four directions as spaced 90° from each other.

As the pipe fittings composed of the above-structured split fittings, there are five variations as shown in FIGS. 1(a)-(e). With the use of suitable fittings, pipes can be freely connected in the lengthwise, widthwise and heightwise directions to construct a desired assembly.

Now, the description is directed to the embodiments of these pipe fittings.

First Embodiment

Figure 2:
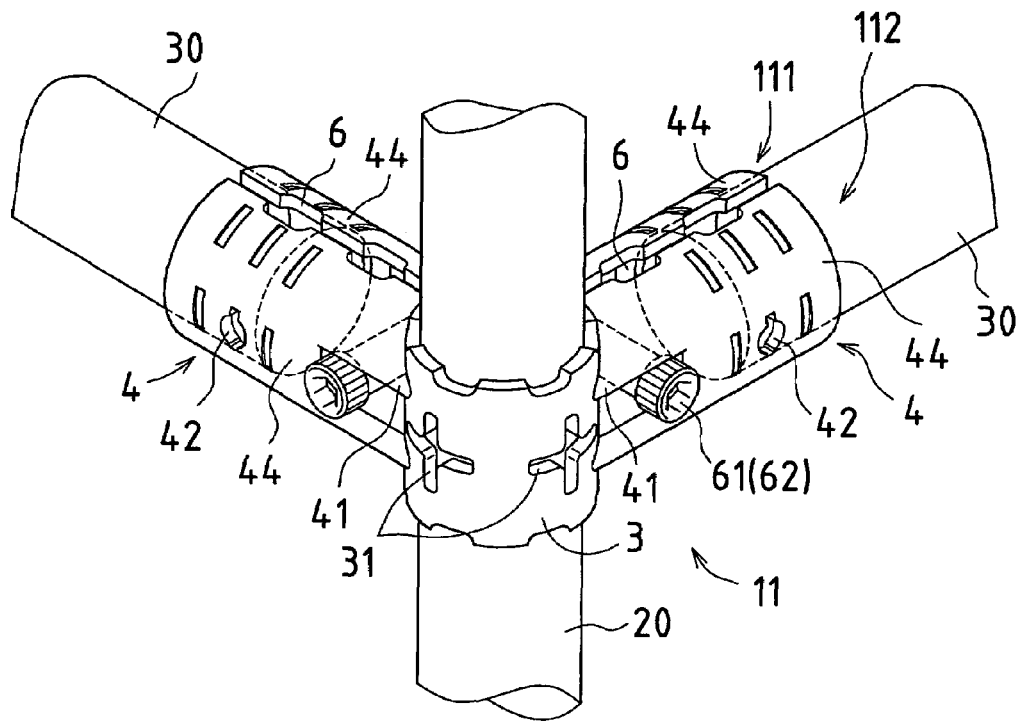
FIG. 2 is a perspective view which describes the first embodiment of the pipe fitting, with pipes being inserted, according to the present invention.
Figure 3:
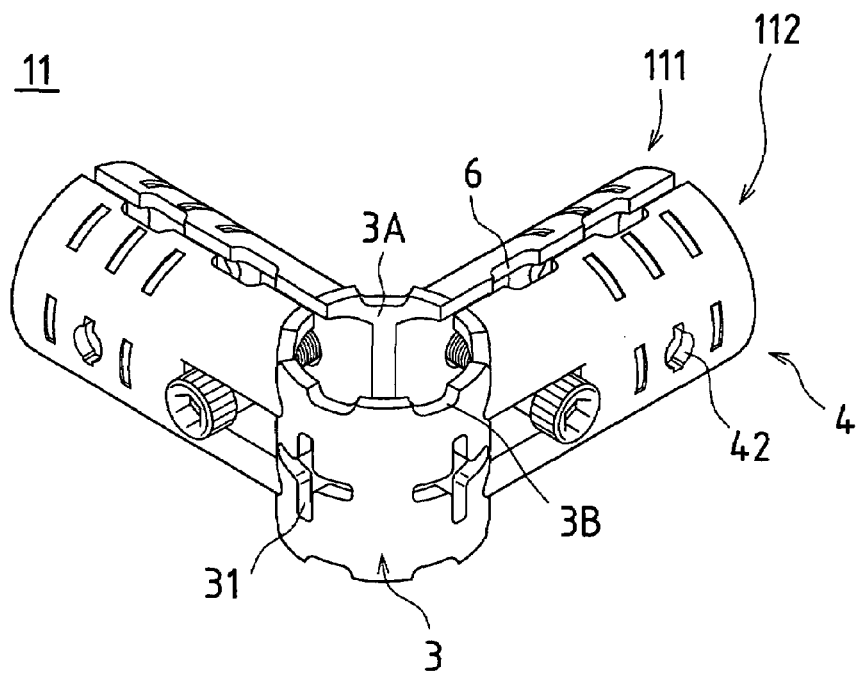
FIG. 3 is a perspective view showing the first embodiment of the pipe fitting according to the present invention.
Figure 4:
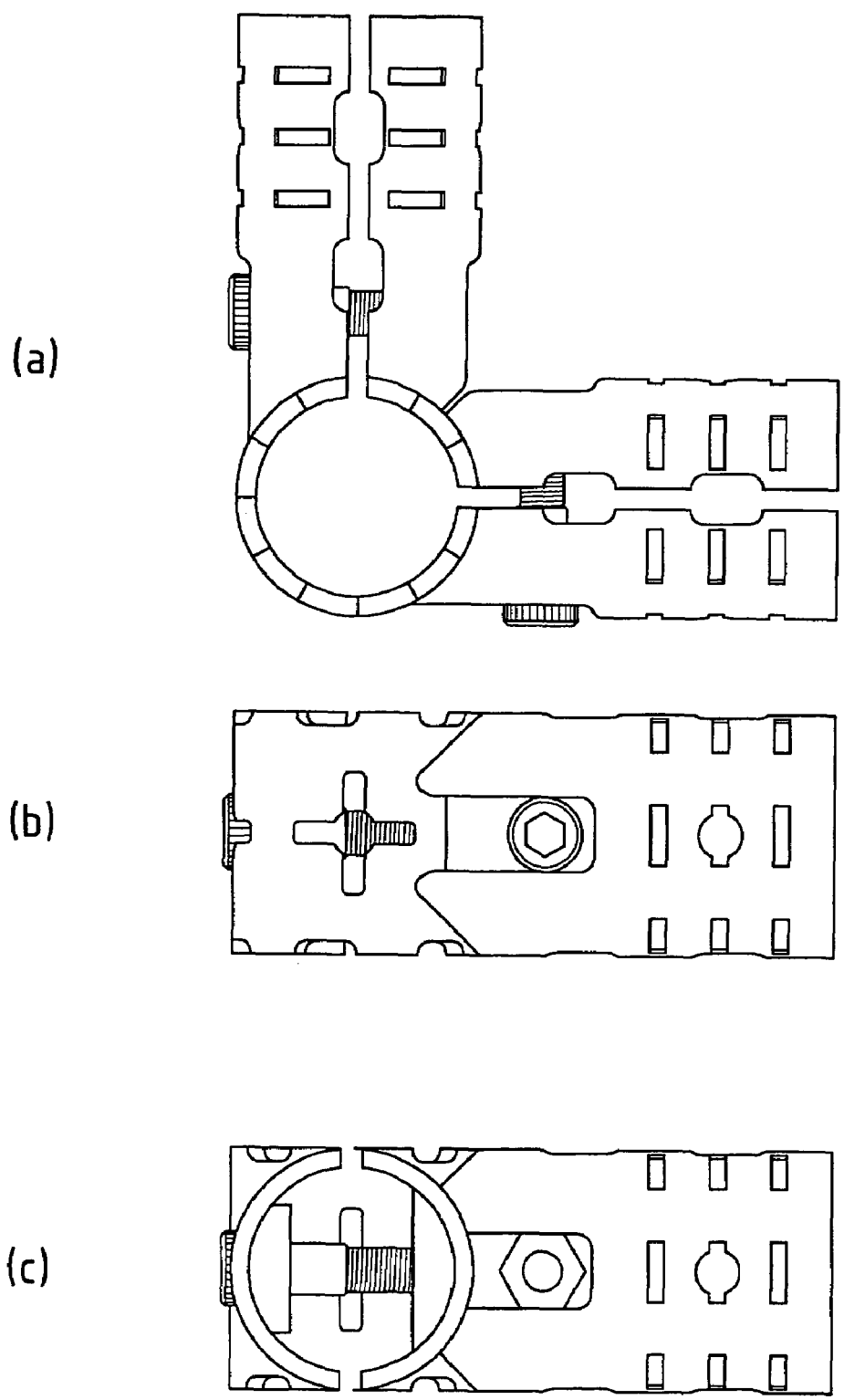
FIG. 4(a) is a plan view thereof.
FIG. 4(b) is a front view thereof.
FIG. 4(c) is a right side view thereof.

FIG. 2 is a perspective view which describes the first embodiment of the pipe fitting, with pipes being inserted, according to the present invention. This illustration corresponds to FIG. 1(a). FIG. 3 is a perspective view showing the first embodiment. FIG. 4(a) is a plan view thereof, FIG. 4(b) is a front view thereof, and FIG. 4(c) is a right side view thereof.

Figure 13:
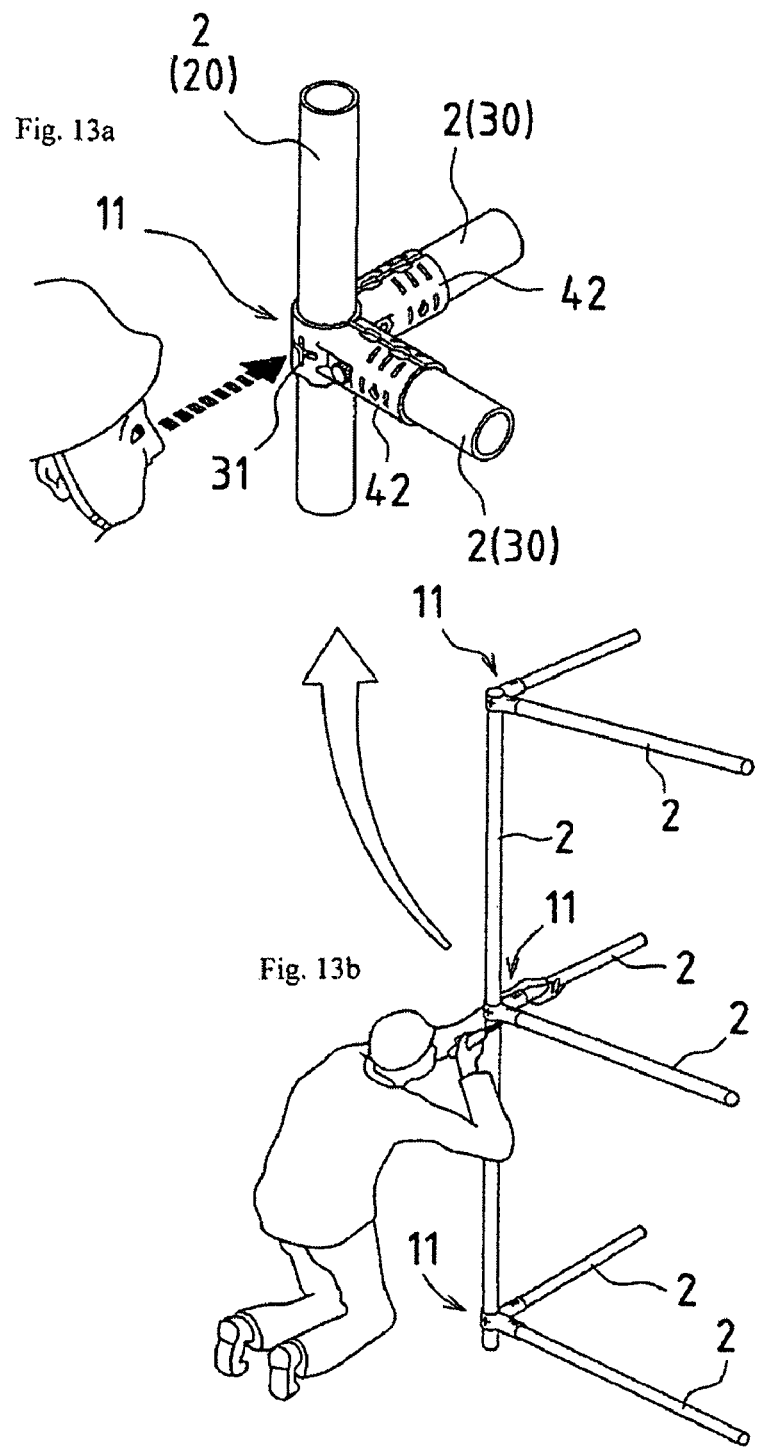
FIG. 13a and FIG. 13b illustrate one of the features of the embodiments according to the present invention.

A pipe fitting 11 comprises two split fittings, namely, a ¼-cylindrical split fitting 111 and a ¾-cylindrical split fitting 112. The ¼-cylindrical split fitting 111 is composed of a ¼ cylinder wall 3A of the central cylinder 3 having a 90° arc, and extended half pipes 44, 44 which have a half pipe shape and which project from both ends of the cylinder wall 3A at 90° relative to the cylinder wall 3A. On the other hand, the ¾-cylindrical split fitting 112 is composed of a ¾ cylinder wall 3B of the central cylinder 3 having a 270° arc, and extended half pipes 44, 44 which have a half pipe shape and which project from both ends of the cylinder wall 3B at 90° relative to the cylinder wall 3B. Combination of the ¼-cylindrical split fitting 111 and the ¾-cylindrical split fitting 112 creates the central cylinder 3 for receiving the pipe 20 and the extended cylinders 4 for receiving the pipes 30. In terms of positional relationship, the pipe 20 and the pipes 30 are fixed vertically with respect to each other. The two extended cylinders 4,4 include bolt holes 41, 41 which penetrate the respective extended cylinders 4, 4. Via the bolt holes 41, 41, the ¼-cylindrical split fitting 111 and the ¾-cylindrical split fitting 112 are fixed by bolts 61 and nuts 62. Besides, the ¾ cylinder wall 3B of the ¾-cylindrical split fitting 112 is provided with cross-shaped slits 31. Each cross-shaped slit 31 extends vertically in the passing direction of the pipe 20 to be inserted into the central cylinder 3, and also extends vertically in the extension direction of the pipes 30 to be inserted into the extended cylinders 4. Notably, the cross-shaped slits 31 exhibit three functions. The first function is to facilitate exact positioning of the pipe 20. In the case where the pipe fitting 11 is fixed to the pipe 20 which is to be inserted into the central cylinder 3, the pipe 20 is marked in advance. Later, the slit 31 is aligned with the marked position to effect exact positioning. FIG. 13 illustrates a manner of adjusting the height by visual inspection. As described above, each of the cross-shaped slits 31 extends not only vertically in the passing direction of the pipe 20 to be inserted into the central cylinder 3, but also vertically in the extension direction of the pipes 30 to be inserted into the extended cylinders 4. Owing to such slits 31, the pipes to be assembled can be positioned and have their spacing adjusted in all of the lengthwise, widthwise and heightwise directions of an assembly (e.g. a shelf), as mentioned previously. Since the slits 31 enable exact positional adjustment of the pipes and the pipe fitting, the obtained assembly shows a high dimensional precision and hence will not wobble.

Figure 14:
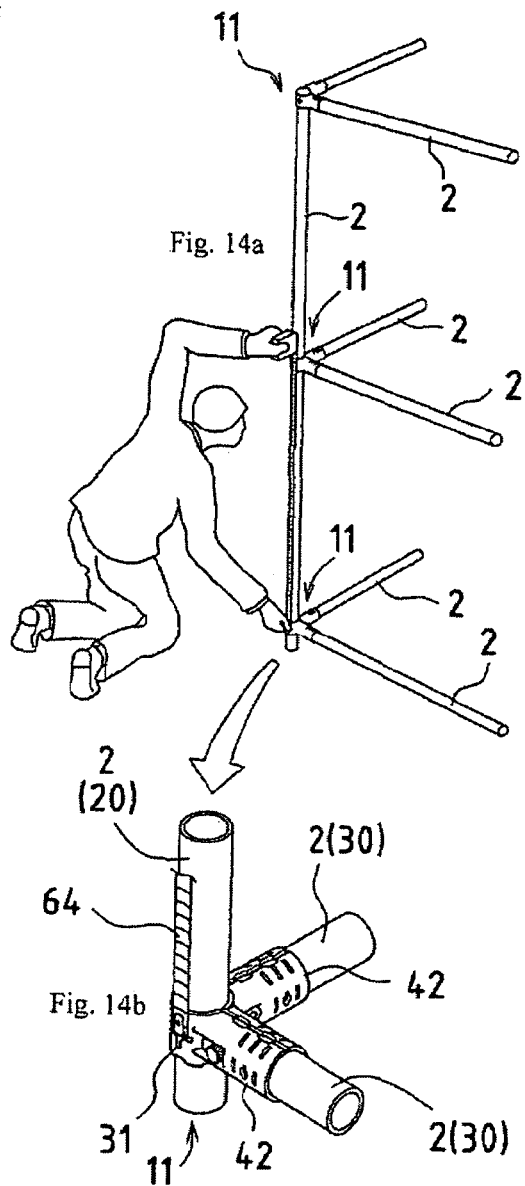
FIG. 14a and 14b illustrates another feature of the embodiments according to the present invention.

The second function concerns a measurement taking operation, during which a metal end tab of a steel tape measure 46 can be hooked at either slit 31. Referring to the operation manner shown in FIG. 14, the advantage resides in that a worker can correctly check, for himself/herself, the spacing between the pipes which constitute an intended assembly (e.g. a shelf). Thus, the slits enable an exact and efficient operation.

Further, the third function is to reinforce the fixed relationship between the pipe 20 and the pipe fitting 11, by screwing a fixing screw through each slit 31. In order to screw the fixing screw, the following methods are adopted. For one, a tapping screw is screwed through a preformed screw hole in the pipe 20 which serves as a backing. For another, preliminary formation of a screw hole is omitted with use of a self-drilling screw which has a cutting-processed end.

In addition, there is an arrangement for reinforcing the fixed relationship between the pipes 30 and the pipe fitting 11. Via an orifice 42 formed in each extended cylinder 4, the components are fixed in a manner similar to the above-mentioned screwing operation through the slits.

Accordingly, the pipes 20, 30 and the pipe fitting 11 are fixed together in a reinforced manner, via the slits 31 and the orifices 42. Therefore, the connection between the pipe fitting and the pipes will not come loose, even in the circumstances that usually cause the connection of the pipe fitting and the pipes to loosen (e.g. where the assembly is moved frequently or installed at a constantly shaking place). While preventing such problem, this arrangement can also reinforce their fixed relationship in a simple manner. As a result, this reinforced structure can materialize a highly durable assembly.

Incidentally, the orifices 42 have an additional function of enabling visual inspection for checking whether the end of each pipe 30 is inserted as far as the predetermined position inside the extended cylinder 4.

Figure 15:
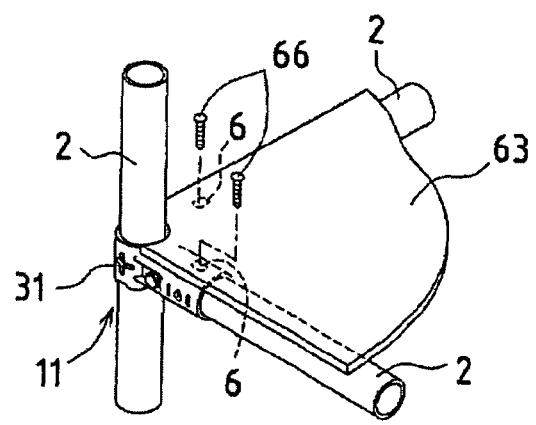
FIG. 15 illustrates a further feature of the embodiments according to the present invention.

Further, opposing notches 6, 6 are formed in the mating edges of the ¼-cylindrical split fitting 111 and the ¾-cylindrical split fitting 112 which constitute the extended cylinders 4. FIG. 15 shows an assembly structure in which a shelf board 63 rests on pipes 2, 2. This assembly is advantageous in that fixing screws 66 for fixing the shelf board 63 can be aligned with the notches 6, 6 and screwed on the pipes 2 through the shelf board 63, so that the shelf board 63 can be equipped in a securely fixed state.

The next description deals with other embodiments concerning the pipe fittings 12, 13, 14 and 15. The structures identical to those mentioned in the first embodiment are indicated by the same signs and not to be described again.

Second Embodiment

Figure 5:
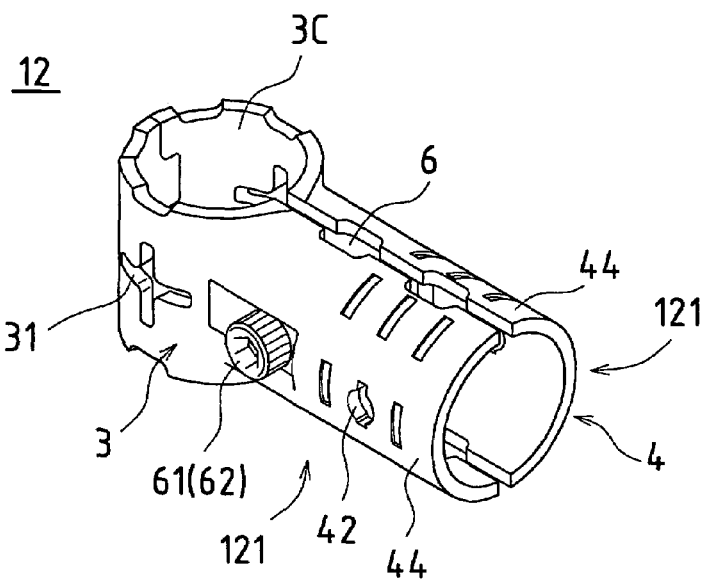
FIG. 5 is a perspective view showing the second embodiment of the pipe fitting according to the present invention.
Figure 6:
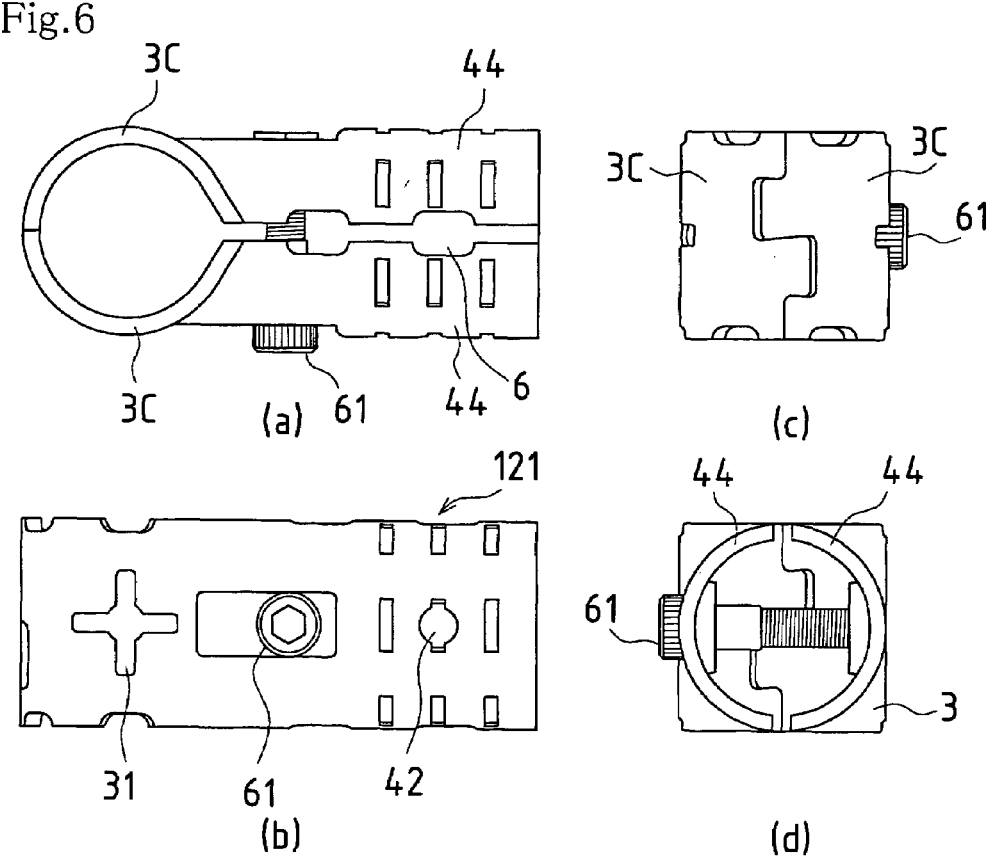
FIG. 6(a) is a plan view thereof.
FIG. 6(b) is a front view thereof.
FIG. 6(c) is a left side view thereof.
FIG. 6(d) is a right side view thereof.

FIG. 5 is a perspective view showing the second embodiment of the pipe fitting according to the present invention. FIG. 6(a) is a plan view thereof, FIG. 6(b) is a front view thereof, FIG. 6(c) is a left side view thereof, and FIG. 6(d) is a right side view thereof.

A pipe fitting 12 comprises two ½-cylindrical single-extension split fittings 121. Each split fitting 121 is composed of a ½ cylinder wall 3C of the central cylinder 3 having a 180° arc, and an extended half pipe 44 which has a half pipe shape and which projects from an end of the cylinder wall 3C at 90° relative to the cylinder wall 3C. Combination of these split fittings 121 creates the central cylinder 3 for receiving a pipe 20 (not shown) and the extended cylinder 4 for receiving a pipe 30 (not shown). In terms of positional relationship, the pipe 20 and the pipe 30 are fixed vertically with respect to each other.

Third Embodiment

Figure 7:
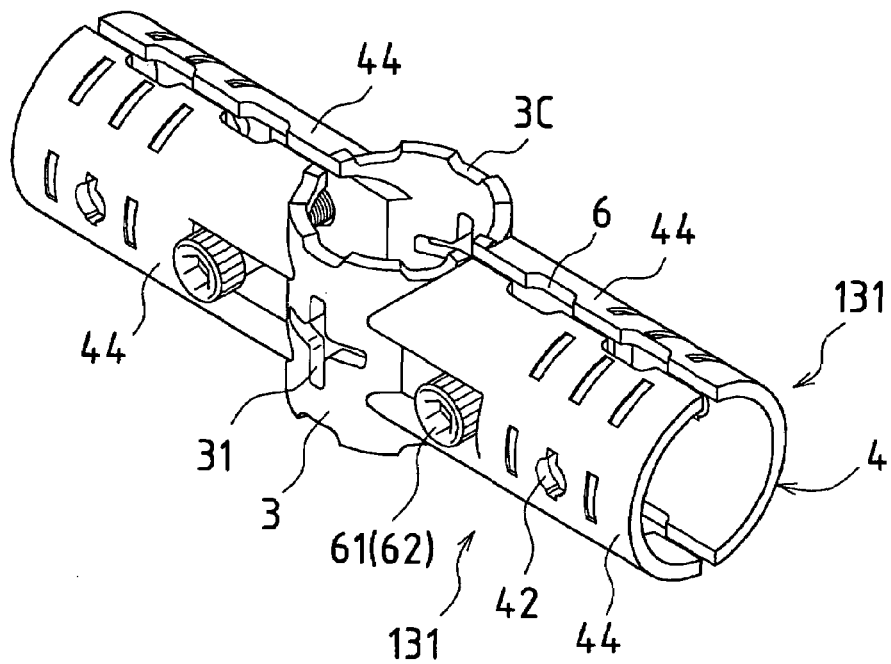
FIG. 7 is a perspective view showing the third embodiment of the pipe fitting according to the present invention.
Figure 8:
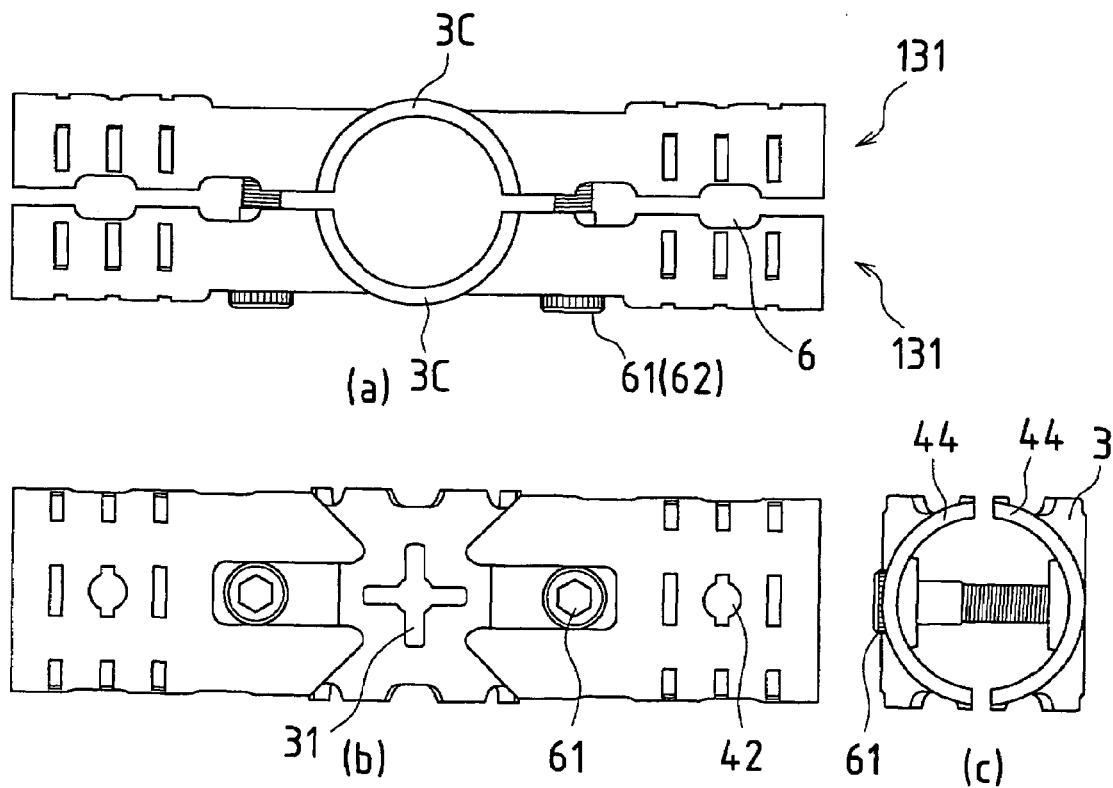
FIG. 8(a) is a plan view thereof.
FIG. 8(b) is a front view thereof.
FIG. 8(c) is a right side view thereof.

FIG. 7 is a perspective view showing the third embodiment of the pipe fitting according to the present invention. FIG. 8(a) is a plan view thereof, FIG. 8 (b) is a front view thereof, and FIG. 8(c) is a right side view thereof.

A pipe fitting 13 comprises two ½-cylindrical double-extension split fittings 131. Each split fitting 131 is composed of a ½ cylinder wall 3C of the central cylinder 3 having a 180° arc, and extended half pipes 44, 44 which have a half pipe shape and which project from both ends of the cylinder wall 3C at 90° relative to the cylinder wall 3C. Combination of these split fittings 131 creates the central cylinder 3 for receiving a pipe 20 (not shown) and the extended cylinders 4 for receiving pipes 30 (not shown). In terms of positional relationship, the pipe 20 and the pipes 30 are fixed vertically with respect to each other.

Fourth Embodiment

Figure 9:
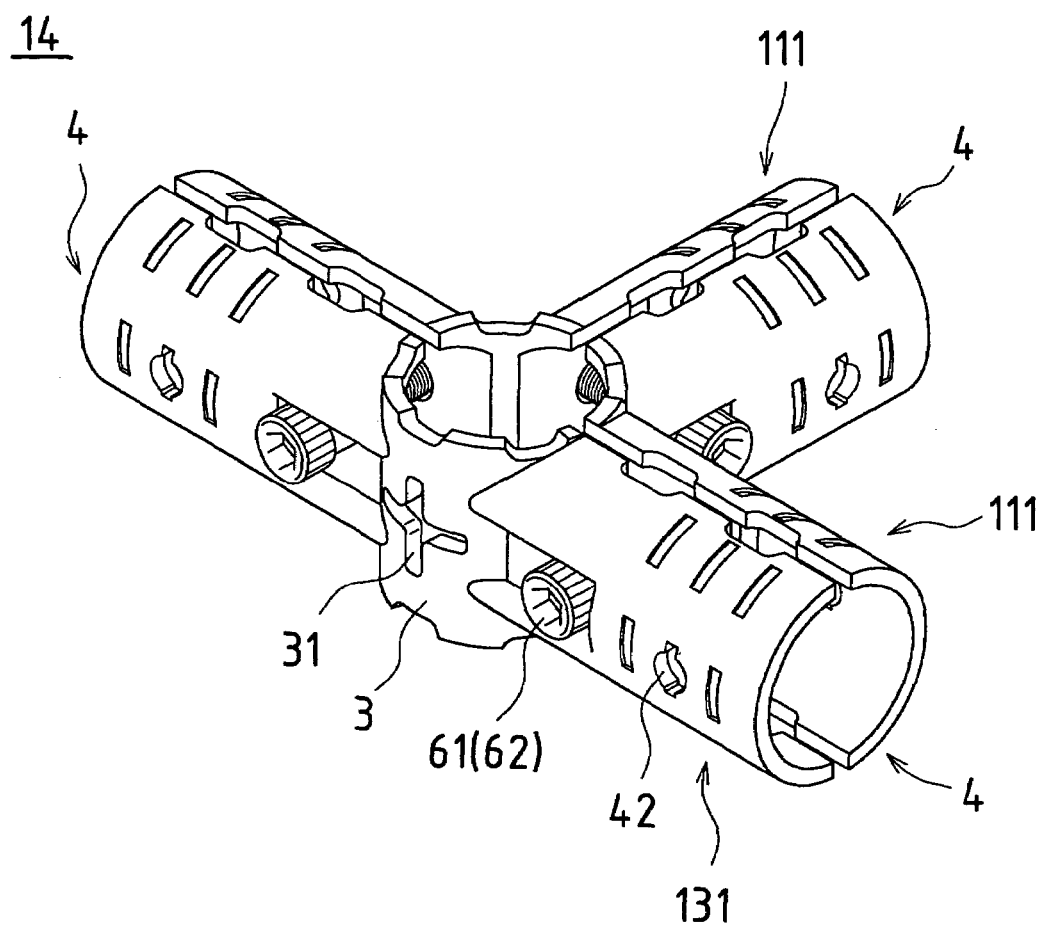
FIG. 9 is a perspective view showing the fourth embodiment of the pipe fitting according to the present invention.
Figure 10:
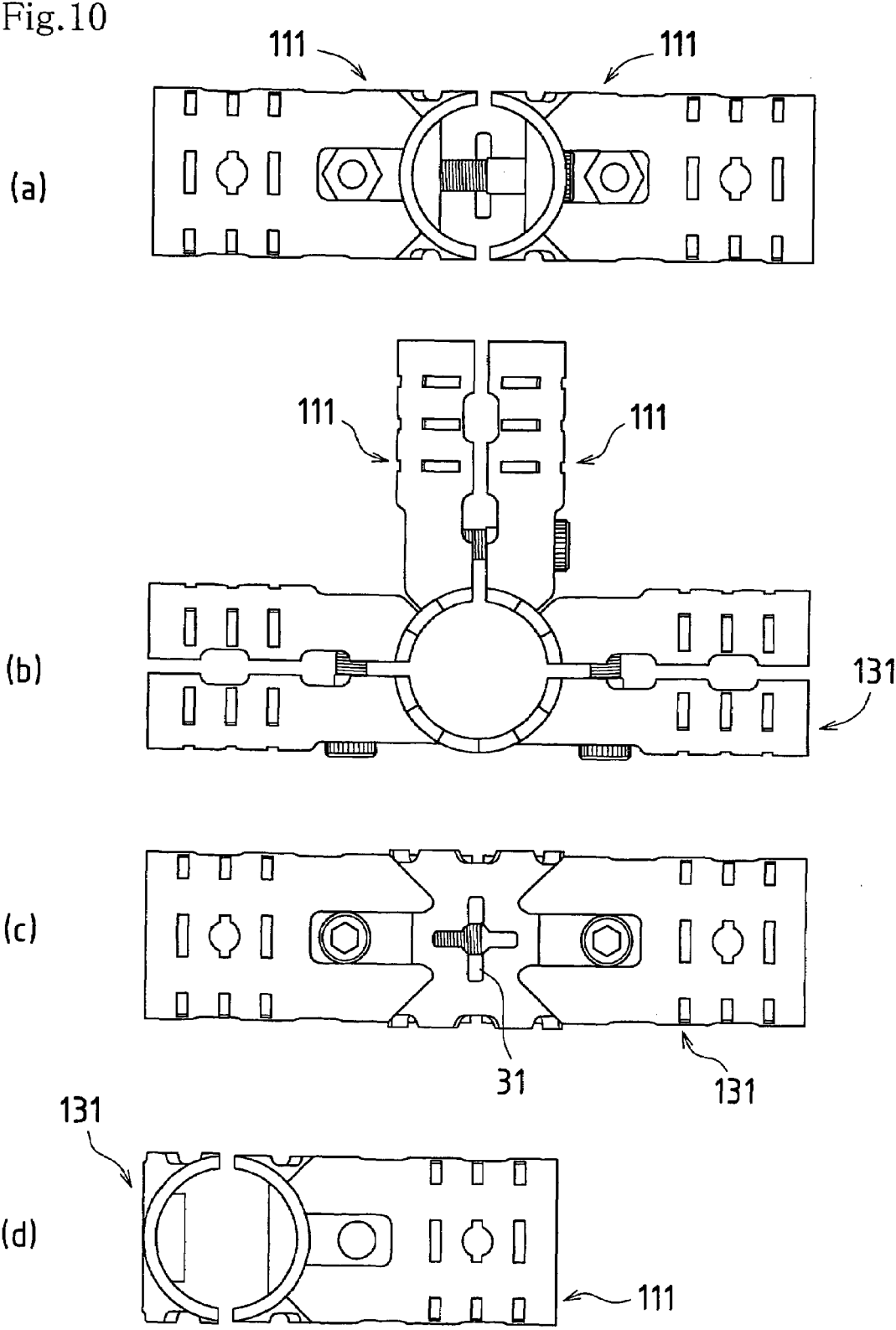
FIG. 10(a) is a rear view thereof.
FIG. 10(b) is a plan view thereof.
FIG. 10(c) is a front view thereof.
FIG. 10(d) is a right side view thereof.

FIG. 9 is a perspective view showing the fourth embodiment of the pipe fitting according to the present invention. FIG. 10(*a*) is a rear view thereof, FIG. 10(*b*) is a plan view thereof, FIG. 10(*c*) is a front view thereof, and FIG. 10(*d*) is a right side view thereof.

A pipe fitting 14 is made by combining two ¼-cylindrical split fittings 111 and a ½-cylindrical double-extension split fitting 113 and is constituted with the central cylinder 3 for receiving a pipe 20 (not shown) and the extended cylinders 4 for receiving pipes 30 (not shown). In terms of positional relationship, the pipe 20 and the pipes 30 are fixed vertically with respect to each other.

Fifth Embodiment

Figure 11:
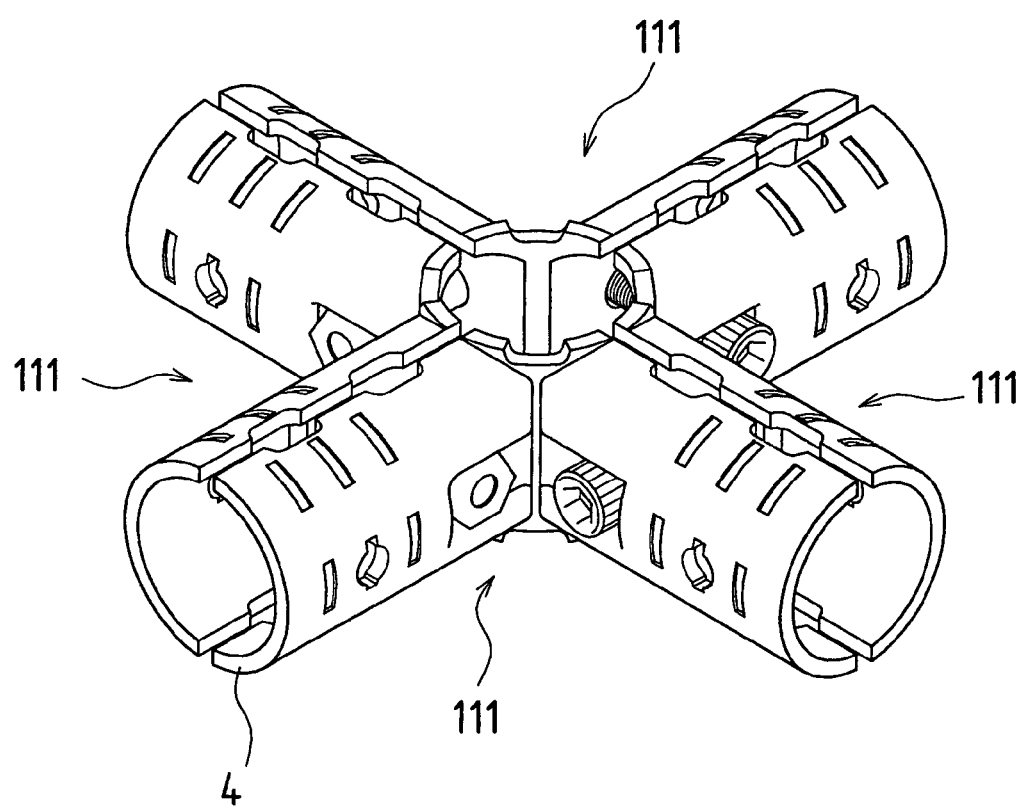
FIG. 11 is a perspective view showing the fifth embodiment of the pipe fitting according to the present invention.
Figure 12:
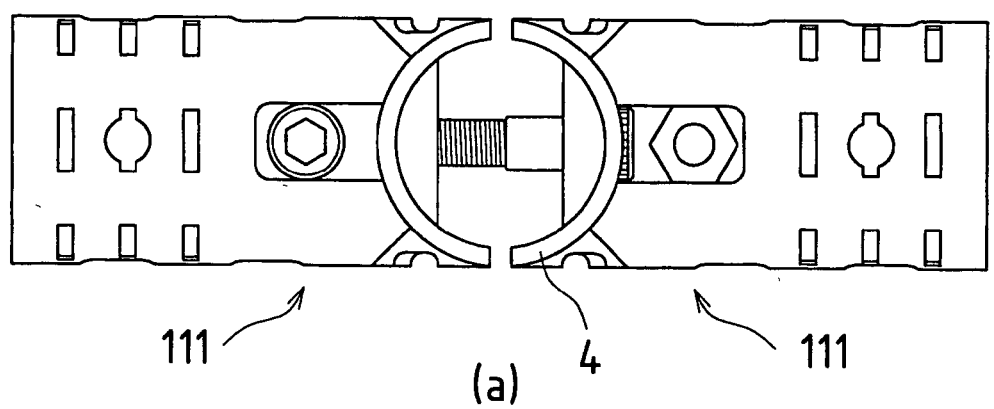
FIG. 12(a) is a front view thereof.
FIG. 12(b) is a plan view thereof.
Figure 12:
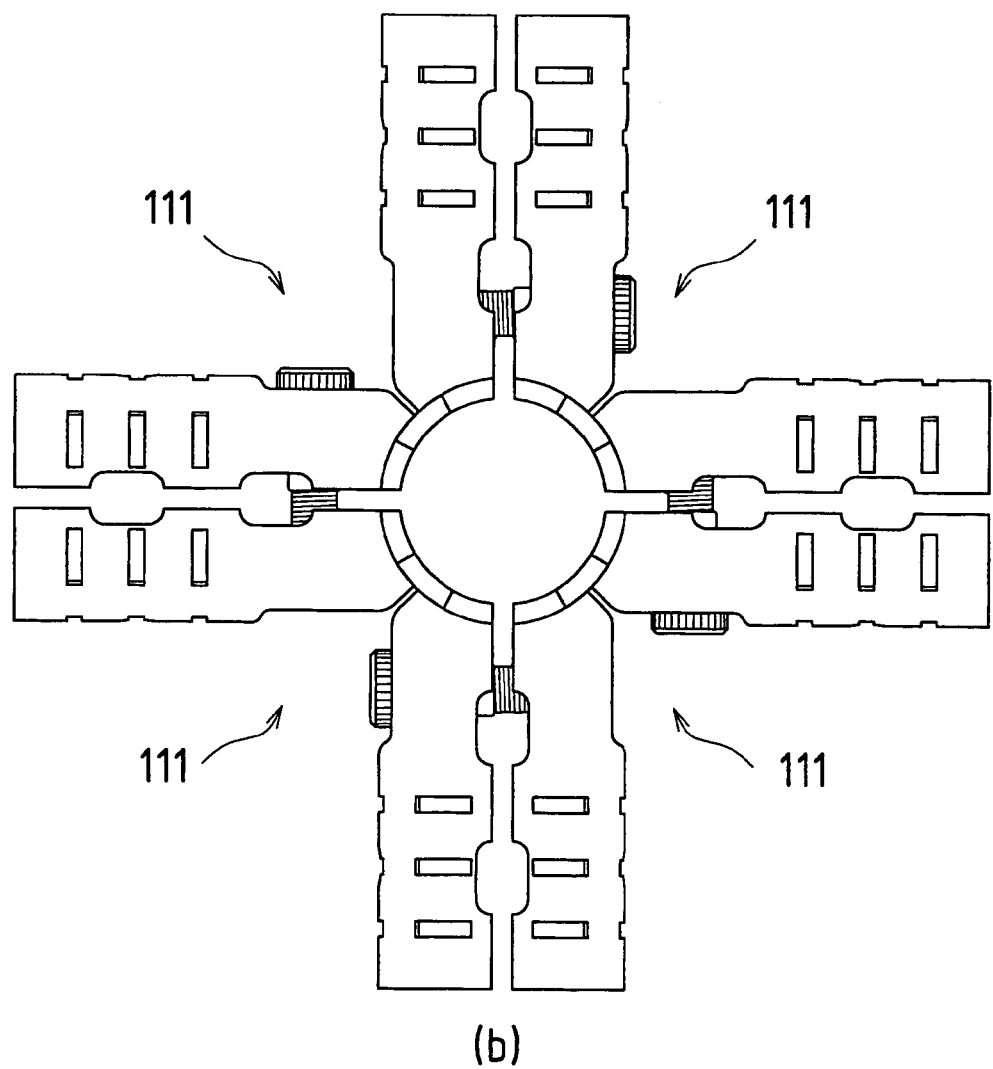

FIG. 11 is a perspective view showing the fifth embodiment of the pipe fitting according to the present invention. FIG. 12(*a*) is a front view thereof, and FIG. 12(*b*) is a plan view thereof.

A pipe fitting 15 is made by combining four ¼-cylindrical split fittings 111 and is constituted with the central cylinder 3 for receiving a pipe 20 (not shown) and the extended cylinders 4 for receiving pipes 30 (not shown). In terms of positional relationship, the pipe 20 and the pipes 30 are fixed vertically with respect to each other.

The pipe fitting 15 is different from those of the previous embodiments in not having the slit 31 which is provided in the previous embodiments.

The pipe fittings of the above embodiments are selectively used in accordance with the joint structure of an assembly, and the type and number thereof is suitably determined.

INDUSTRIAL APPLICABILITY

As described above, the pipe fitting according to the present invention is beneficial in fixedly connecting the pipes and the pipe fittings with a favorable dimensional precision and a reinforcing effect, ensuring an exact and efficient assembly operation, and providing a highly durable assembly of excellent quality.

The invention claimed is:

1. A pipe fitting comprising a combination of a plurality of split fittings and having a central cylinder formed in an arcuate shape, curving about a vertically-extending central cylinder axis and extending vertically to define a central cylinder height and an extended cylinder which outwardly projects from the central cylinder, is formed in a generally semicircular shape to define a vertically-extending extended cylinder diameter and curves about a horizontally-extending extended cylinder axis extending perpendicularly to the vertically-extending central cylinder axis, the central cylinder and the extended cylinder being capable of receiving pipes from orthogonal directions with respect to each other, characterized in that the extended cylinder includes a bolt hole which is located near the central cylinder, which is disposed centrally about a horizontally-extending bolt hole axis perpendicularly traversing the horizontally-extending extended cylinder axis and the horizontally-extending bolt hole axis extending perpendicularly to the vertically-extending central cylinder axis and which penetrates the extended cylinder, that the central cylinder has an aperture provided in and through a side surface thereof and penetrating completely through the central cylinder, and that each split fitting is operably fixed to each other by a bolt and nut via the respective bolt hole such that the split fittings can hold pipes in a clamped manner, wherein the aperture provided in and through the side surface of the central cylinder is generally cross-shaped in configuration, the aperture having a first elongated slit portion extending orthogonally relative to an insertion direction of the pipe in the central cylinder and a second elongated slit portion extending parallel relative to the insertion direction.

2. A pipe fitting according to claim 1, characterized in that the extended cylinder has an auxiliary fixation hole which locates further away from the central cylinder than the bolt hole.

3. A pipe fitting according to claim 1, characterized in that the extended cylinder is formed by mating two split fittings together, and that each of the split fittings has a notch provided in a mating edge thereof, as opposed to each other.

4. A pipe fitting according to claim 1, characterized in comprising two split fittings, wherein a first split fitting is a ¼-cylindrical split fitting which is composed of a ¼ cylinder wall of the central cylinder having a 90° arc, and extended half pipes which have a half pipe shape and which project from both ends of the cylinder wall at 90° relative to the cylinder wall, and wherein a second split fitting is a ¾-cylindrical split fitting which is composed of a ¾ cylinder wall of the central cylinder having a 270° arc, and extended half pipes which have a half pipe shape and which project from both ends of the cylinder wall at 90° relative to the cylinder wall.

5. A pipe fitting comprising a combination of four ¼-cylindrical split fittings of claim 4 and having a central cylinder and extended cylinders which outwardly project from the central cylinder, wherein the central cylinder and the extended cylinders are capable of receiving pipes from orthogonal directions with respect to each other.

6. A pipe fitting according to claim 5, characterized in that each extended cylinder has an auxiliary fixation hole which locates further away from the central cylinder than the bolt hole.

7. A pipe fitting according to claim 5, characterized in that each extended cylinder is formed by mating two split fittings together, and that each of the split fittings has a notch provided in a mating edge thereof, as opposed to each other.

8. A pipe fitting according to claim 1, characterized in comprising a combination of two ½-cylindrical single-extension split fittings, wherein each split fitting is composed of a ½ cylinder wall of the central cylinder having a 180° arc, and an extended half pipe which has a half pipe shape and which projects from an end of the cylinder wall at 90° relative to the cylinder wall.

9. A pipe fitting according to claim 1, characterized in comprising a combination of two ½-cylindrical double-extension split fittings, wherein each split fitting is composed of a ½ cylinder wall of the central cylinder having a 180° arc, and extended half pipes which have a half pipe shape and which project from both ends of the cylinder wall at 90° relative to the cylinder wall.

10. A pipe fitting according to claim 1, characterized in comprising a combination of two ¼-cylindrical split fittings and a ½-cylindrical double-extension split fitting wherein each one of the two ¼-cylindrical split fittings is a ¼-cylindrical split fitting which is composed of a ¼ cylinder wall of the central cylinder having a 90° arc, and extended half pipes which have a half pipe shape and which project from both ends of the cylinder wall at 90° relative to the cylinder wall, and wherein the ½-cylindrical double-extension split fitting is composed of a ½ cylinder wall of the central cylinder having a 180° arc, and extended half pipes which have a half pipe shape and which project from both ends of the cylinder wall at 90° relative to the cylinder wall.

11. An assembly in which pipes are fixed by plurality of pipe fittings according to claim 1.

* * * * *